L. Burns,
Manf. Carriage Irons.

No. 103,296. Patented May 24, 1870.

Witnesses:

Inventor:
L. Burns
Per Munn & Co.
Attorneys.

United States Patent Office.

LEANDER BURNS, OF PORT CHESTER, NEW YORK.

Letters Patent No. 103,296, dated May 24, 1870.

IMPROVED DIE FOR FORMING CARRIAGE-STEPS.

The Schedule referred to in these Letters Patent and making part of the same.

*To all whom it may concern:*

Be it known that I, LEANDER BURNS, of Port Chester, in the county of Westchester and State of New York, have invented a new and useful Improvement in Dies for Forging Carriage-Steps; and I do hereby declare that the following is a full, clear, and exact description thereof, which will enable others skilled in the art to make and use the same, reference being had to the accompanying drawings forming part of this specification.

Similar letters of reference indicate corresponding parts.

The invention relates to and consists in dies for making carriage-steps, as hereinafter more particularly described.

Figure 1:
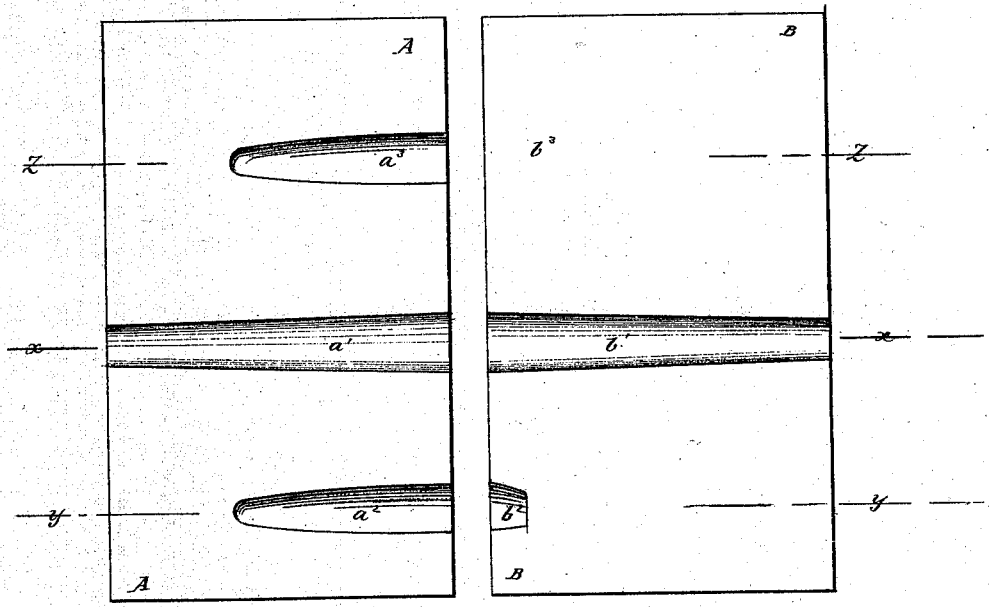
Figure 1 represents a face view of the lower and upper dies.
Figure 2:
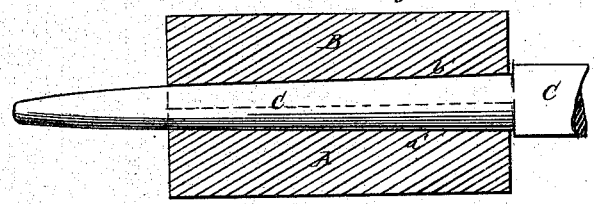
Figure 2 is a vertical cross-section of the dies, taken through the line $x\ x$, fig. 1, and showing the step-shank in place after the first operation.
Figure 3:
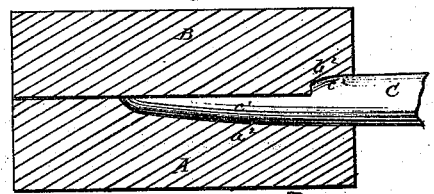
Figure 3 is a vertical cross-section of the dies, taken through the line $y\ y$, fig. 1, and showing the step-shank in place after the second operation.

A is the lower, and B is the upper die, across the face of which is formed a groove, $a^1\ b^1$, of the proper size and shape to form the body of the shank C, as shown in fig. 2.

In the die A is formed a groove or recess, $a^2$, to shape the end $c^1$ of the shank C, that passes beneath the step-plate D, and in the upper die B is formed a recess, $b^2$, to form the shoulder $c^2$ that overlaps the upper side of the step-plate D.

Figure 4:
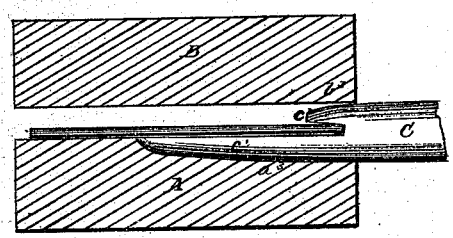
Figure 4 is a vertical cross-section of the dies, taken through the line $z\ z$, fig. 1, and showing the step in place for welding the step-plate to the shank.

After the shank C is removed from the die $a^2\ b^2$, the shoulder $c^2$ is slit with a chisel, or other suitable tool, to receive the edge of the step-plate D, as shown in fig. 4.

Figure 5:
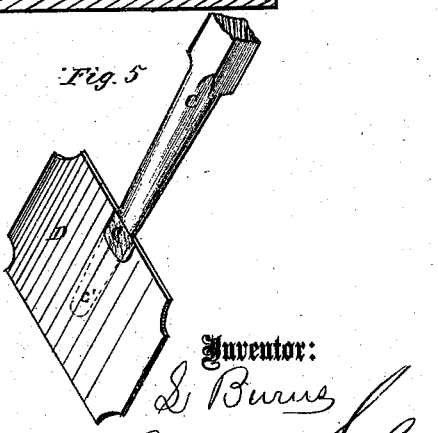
Figure 5 is a perspective view of the completed step, the shank being broken away.

The shank C, with the step-plate D in place, is then placed in the groove $a^3$ of the die A, and, by the action of the flat part $b^3$ of the die B, the shank C and step-plate D are firmly welded together, leaving the upper side of the step smooth, as shown in fig. 5.

The step-plate D is cut out of a plate or bar of suitable size and thickness, by means of a press or other suitable machine.

In this way, a neat, strong, and substantial carriage-step is quickly and cheaply formed.

Having thus described my invention,

I claim as new and desire to secure by Letters Patent—

The series of dies A $a^1\ a^2\ a^3$ and B $b^1\ b^2\ b^3$, constructed and operating substantially as herein shown and described, for the purpose of forging carriage-steps, as set forth.

LEANDER BURNS.

Witnesses:
 WM. H. CREEMER,
 F. N. WILCOX,
 B. K. TOMPKINS.